United States Patent Office 3,787,500
Patented Jan. 22, 1974

3,787,500
DISUBSTITUTED CYCLOPROPENONES AND METHOD OF PRODUCTION
Stephen W. Tobey, Sudbury, Mass., assignor to The Dow Chemical Company, Midland, Mich.
No Drawing. Original application May 3, 1968, Ser. No. 726,549, now Patent No. 3,657,348, dated Apr. 18, 1972. Divided and this application Jan. 20, 1972, Ser. No. 219,584
Int. Cl. C07c 49/44
U.S. Cl. 260—590       2 Claims

ABSTRACT OF THE DISCLOSURE

New disubstituted cyclopropenones and a new method of preparing said cyclopropenones comprising reacting a halocyclopropenium Lewis acid salt with a substituted olefin containing a carbon to carbon double bond wherein one terminal carbon atom of the double bond is sterically accessible to attack by the cyclopropenium ion, and the other terminal carbon atom of the double bond bears substituents contributing to the formation of a stable carbonium ion.

---

This is a division of application Ser. No. 726,549, filed May 3, 1968, now U.S. Pat. 3,657,348, dated Apr. 18, 1972.

SUMMARY OF THE INVENTION

The present invention is directed to disubstituted cyclopropenones corresponding to one of the formulas

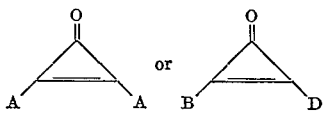

In the present specification and claims, A represents a 2,2-dihalovinyl, 2-methylpropenyl, 2-halo-2-methylpropyl and 2-methyl-2-halocyclohexyl; B represents substituted phenyl and D represents 2,2-dihalovinyl, 2-methylpropenyl, 2-halo-2-methylpropyl or 2-methyl-2-halocyclohexyl. As employed in the present specification and claims, the term "halo" represents bromine or chlorine and the term "substituted phenyl" represents p-fluorophenyl, p-bromophenyl, p-chlorophenyl, p-tolyl and 2,4,6-trimethylphenyl. The new compounds of the present invention are crystalline solid materials which are of low solubility in water and of moderate solubility in various common organic solvents such as acetone and chloroform. The compounds of the present invention have been found to be useful for the control of mosquito larva and various microorganisms such as Staphylococcus aureus, Candida albicans, E. coli, Salmonella typhosa, Bacillus subtilis, Pulluraria pullulans, apple scab, late blight, and downy mildew.

In the new process of the present invention, the new disubstituted cyclopropenone products are prepared by reacting a substituted olefin with a halocyclopropenium salt of a strong Lewis acid to form a 3,3-dihalocyclopropene intermediate which is hydrolyzed with water to the corresponding cyclopropenone. The halocyclopropenium salt corresponds to the formula

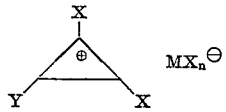

In the present specification and claims, X represents chloro or bromo, Y represents X or substituted phenyl, M represents the strong Lewis acid metal cation such as $Al^{+3}$, $Fe^{+3}$, $Sb^{+5}$ and $Ga^{+3}$ and $n$ represents the valence of M plus one. The term "substituted olefin" as employed in the present specification and claims refers to an olefin containing a carbon to carbon double bond

wherein one carbon terminal of the double bond is sterically accessible to attack by the halocyclopropenium ion and the other carbon terminal of the double bond is substituted so as to facilitate formation of a stable carbonium ion center. Substituents contributing stability to, and thus allowing the formation of, a stable carbonium ion center include chloro, bromo and methyl. In the process of the present invention, the organic solvent employed as the reaction medium should have sufficient ionizing power to permit at least partial dissolution of the cyclopropenium ion salt, but should not react chemically with the cation, nor bind the Lewis acid so strongly that the cyclopropenium ion salt reverts to covalent tetrahalocyclopropene. Representative solvents include methylene chloride, chloroform, 1,1,2-trichloroethane, 1,2-dichloroethane, 1,1-dichloroethane and 1,1,2,2-tetrachloroethane.

Good yields of the desired product are prepared by employing substantially stoichiometric proportions of the halocyclopropenium Lewis acid salt and the substituted olefin. However, an excess of either reactant can be employed without adversely affecting the yield or the desired product. In fact, an excess of the substituted olefin is often employed. The reaction between the halocyclopropenium Lewis acid salt and the substituted olefin takes place readily with the production of a substituted 3,3-dihalocyclopropene intermediate when the temperature of the reaction mixture is maintained at between —20° and 80° C. and preferably at a temperature of from 0° to 30° C. The formation of the 3,3-dihalocyclopropene intermediate takes place readily and it is generally not necessary to maintain the reaction mixture at the reaction temperature for greater than ¼ to 1 hour. The substituted 3,3-dihalocyclopropene intermediate thus formed corresponds to one of the formulas

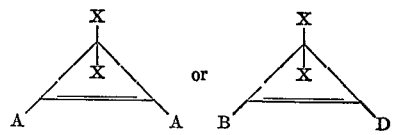

depending on the halocyclopropenium Lewis acid salt and substituted olefin employed. Following the reaction period, the reaction mixture containing the substituted 3,3-dihalocyclopropene intermediate is poured into a large excess of water to hydrolyze the intermediate to the corresponding disubstituted cyclopropenone. This disubstituted cyclopropenone product is then separated from the aqueous mixture by conventional isolation procedures.

The disubstituted cyclopropenone compounds of the present invention corresponding to the formula

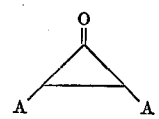

are prepared by reacting a substituted olefin with a halocyclopropenium Lewis acid salt to produce a substituted 3,3-dihalocyclopropene intermediate which is then hydrolyzed with water to the corresponding cyclopropenone. Representative halocyclopropenium Lewis acid salts include trichlorocyclopropenium tetrachloroaluminate,
tribromocyclopropenium tetrabromoaluminate,
trichlorocyclopropenium tetrachloroferrate, tribromocyclopropenium tetrabromoferrate,
trichlorocyclopropenium hexachloroantimonate,
trichlorocyclopropenium tetrachlorogallate, and
tribromocyclopropenium tetrabromogallate.

In carrying out the process of the present invention, the reactants can be contacted together in any order or fashion. However, in a convenient procedure, the halocyclopropenium Lewis acid salt is dispersed in the reaction medium and the substituted olefin added thereafter. Representative substituted olefins include 1,1-dichloroethylene; 1,1-dibromoethylene; 2-methylpropene and 1-methylcyclohexene. In a convenient procedure the halocyclopropenium Lewis acid salt-reaction medium mixture is maintained at the reaction temperature while the substituted olefin starting material is added slowly portionwise. If the substituted olefin is gaseous, it can be bubbled into the reaction mixture. In a preferred procedure, sulfur dioxide is bubbled through a dispersion of the halocyclopropenium Lewis acid salt in the reaction medium prior to addition of the olefin to facilitate dissolution of the halocyclopropenium Lewis acid salt.

While the reactants are consumed in molar quantities equivalent to 2 molar proportions of substituted olefin per molar proportion of halocyclopropenium Lewis acid salt, a large excess of either starting material can be employed without adversely affecting the yield or desired product. In a convenient procedure, an excess of the substituted olefin is employed. However, molar excesses of the substituted olefin greater than 4 to 5 fold with respect to the halocyclopropenium Lewis acid salt are not generally considered economically desirable. Following the addition of the substituted olefin to the reaction mixture, the temperature is maintained within the reaction temperature range for from a few minutes to an hour or more. The reaction mixture is then allowed to cool, whereupon it is poured into an excess of cold water to hydrolyze the substituted 3,3 - dihalocyclopropene intermediate to the corresponding cyclopropenone. The addition of the reaction mixture to the cold water results in the formation of a two-phase system comprised of an organic layer and an aqueous layer, with the cyclopropenone product to be found in the organic layer.

The product containing organic phase is separated by decantation, dried and distilled under reduced pressure to remove the low boiling constituents and obtain the disubstituted cyclopropenone product as an oily or solid residue. This product residue can be employed for the uses herein set forth or further purified by washing or recrystallization before being so employed. When 2-methylpropene is employed as the substituted olefin in the process just described, a mixture of bis(2-chloro-2-methylpropyl) cyclopropenone and bis(2 - methylpropenyl)cyclopropenone is obtained. These two products are separated by fractional crystallization.

The disubstituted cyclopropenones of the present invention corresponding to the formula

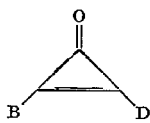

wherein B represents substituted phenyl, which for the sake of convenience will be called phenylvinylcyclopropenones, are prepared by reacting a substituted olefin with a phenylhalocyclopropenium Lewis acid salt corresponding to the formula

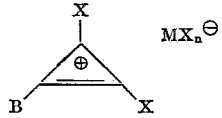

The reaction is carried out in an organic solvent as reaction medium and proceeds readily at temperatures from —20 to 80° C. and preferably from 0° to 30° C. with the production of the substituted 3,3-dihalocyclopropene intermediate. This intermediate is then hydrolyzed in water to produce the corresponding disubstituted cyclopropenone. The reactants are consumed in substantially equimolar proportions and the use of the reactants in such proportions gives good yields of the desired product. However, as in the case of the production of the other cyclopropenone products of the present invention, the use of an excess of either reactant does not adversely affect the yield or the desired product.

In carrying out the production of the phenylvinylcyclopropenones of the present invention, the reactants are contacted together and the reaction carried out as previously described for the other disubstituted cyclopropenone products of the present invention. Representative phenylhalocyclopropenium Lewis acid salts include 1-(4-fluorophenyl)-2,3-dichlorocyclopropenium tetrachloroaluminate;
1-(4-bromophenyl)-2,3-dichlorocyclopropenium tetrachloroaluminate;
1-(4-chlorophenyl)-2,3-dibromocyclopropenium tetrabromoferrate;
1-(2,4,6-trimethylphenyl)-2,3-dichlorocyclopropenium hexachloroantimonate;
1-(p-tolyl)-2,3-bromocyclopropenium tetrabromoaluminate.

The substituted 3,3-dihalocyclopropene intermediate is hydrolyzed with water to form the corresponding disubstituted cyclopropenone product in a manner as previously described with isolation of the disubstituted cyclopropenone product also being carried out as previously described.

In an alternative embodiment of the present invention, a tetrahalocyclopropene corresponding to the formula

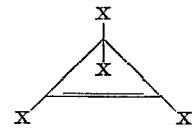

is reacted with a strong Lewis acid to produce a halocyclopropenium Lewis acid salt employed as a starting material in the present invention. This halocyclopropenium Lewis acid salt is then reacted in situ with a substituted olefin to produce the substituted 3,3-dihalocyclopropene intermediate which is subsequently hydrolyzed to the corresponding cyclopropenone. The reaction between the tetrahalocyclopropene and strong Lewis acid is carried out in an organic liquid reaction medium as previously defined. Similarly, the reaction proceeds readily at a temperature of from —20° to 80° C. and preferably at a temperature from 0° C. to the reflux temperature of the reaction mixture. The reactants are consumed in equimolar proportions and the use of the strong Lewis acid and tetrahalocyclopropene such as tetrachlorocyclopropene or tetrabromocyclopropene in substantially equimolar proportions is preferred; however, an excess (up to about 20 percent by weight) can be employed. Following the reaction period, the halocyclopropenium Lewis acid salt is reacted in situ with the substituted olefin in accordance with the teachings of the present invention.

In a still further embodiment of the present invention, a tetrahalocyclopropene such as tetrabromocyclopropene or tetrachlorocyclopropene is reacted with a strong Lewis acid in an organic solvent as reaction medium and at a temperature of from —20° to 80° to form the trihalocyclopropenium Lewis acid salt. This trihalo Lewis acid salt is then reacted in situ with a substantially equimolar proportion of the substituted benzene such toluene, chlorobenzene, fluorobenzene, bromobenzene or 1,3,5-trimethylbenzene. The reaction between the trihalocyclopropenium Lewis acid salt and the substituted benzene proceeds readily at a temperature of from about —20° to 40° C.

with the formation of the phenyl dihalocyclopropenium Lewis acid salt corresponding to the formula

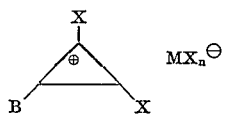

The reaction mixture is maintained at the reaction temperature for a short period of time, 5 minutes to an hour.

In producing the disubstituted cyclopropenones of the present invention having at least one dihalovinyl substituent by reacting a tetrahalocyclopropene and Lewis acid, or a halocyclopropenium Lewis acid salt, with a 1,1-dihaloethylene, optimum yields are obtained when all of the halogen substituents are the same; e.g., all chlorine or all bromine.

SPECIFIC EMBODIMENTS

The following examples merely illustrates the present invention and are not deemed to be limiting.

Example 1

A 250 milliliter round-bottomed, 3-necked flask was charged with dried methylene chloride (100 ml.) and aluminum chloride (2.67 grams, 0.02 mole). The flask was then fitted with a reflux condenser and gas inlet capillary. The reaction mixture was stirred and gaseous sulfur dioxide bubbled through the aluminum chloride-methylene chloride suspension for about 10 minutes until a homogeneous solution was formed. Thereafter, stirring was continued and tetrachlorocyclopropene (3.55 grams, 0.02 mole) was introduced into the reaction mixture whereupon there was a partial precipitation of fine needles of the trichlorocyclopropenium tetrachloroaluminate. While the stirring was continued, 1,1-dichloroethylene (3.3 ml., 4.0 grams, 0.04 mole) was added to the reaction mixture. Upon completion of the addition of the 1,1-dichloroethylene, the reaction mixture was heated to the reflux temperature and maintained there for 20 minutes. The heating was then discontinued and the reaction mixture was allowed to cool to room temperature. The cooled reaction mixture was poured with stirring into 300 milliliters of ice water to yield a two-phase system comprised of an aqeuous layer and a methylene chloride layer. The methylene chloride layer was decanted and dried over molecular sieves. The dried methylene chloride solution was then filtered and stripped under reduced pressure to remove the low boiling constituents to obtain a bis(2,2-dichlorovinyl)cyclopropenone product as a crystalline residue which upon recrystallization from acetone was found to melt at 195° to 197° C. (corrected)

Example 2

A reaction vessel was charged with dried methylene chloride (100 ml.) and aluminum bromide (6.2 grams, 0.023 mole). Sulfur dioxide was bubbled into the mixture whereupon the aluminum bromide passed into solution. Tetrabromocyclopropene (7.15 grams, 0.02 mole) was then added. Following the addition of the tetrabromocyclopropene, a mixture of methylene chloride (8 ml.) and freshly distilled 1,1-dibromoethylene (3.5 ml., .04 mole) was added dropwise over five minutes to the reaction mixture. The reaction mixture was thereafter heated to reflux for about 20 minutes. Following the heating period, the reaction mixture was allowed to cool and the cooled reaction mixture poured into ice water (3 times the volume of the reaction mixture) whereupon an organic layer and an aqueous layer formed. The organic layer was separated by decantation, dried over molecular sieves and the dried organic layer was stripped under reduced pressure to remove the major portion of the low boiling constituents and cause the product to precipitate out of the remaining liquid as a crystalline solid. This crystalline solid product was isolated by filtration and dissolved in acetone. The desired bis(2,2-dibromovinyl)cyclopropenone product was crystallized from acetone, removed by filtration and recrystallized from acetone once more to obtain a crystalline solid product having a corrected melting point of 183° to 185° C.

Example 3

2-methylpropene was bubbled into a suspension of 10.3 grams of trichlorocyclopropenium tetrachloroaluminate dispersed in 25 milliliters of methylene chloride. The addition of the 2-methylpropene was carried out over a period of about 15 minutes and during this period the reaction mixture was maintained at room temperature. Upon completing the addition of the 2-methylpropene, the reaction mixture was poured into 200 milliliters of ice water whereupon the aqueous mixture separated into an organic layer and an aqueous layer. The two-phase system was twice extracted with 15-milliliter portions of methylene chloride and the methylene chloride extracts thereafter washed with water. The washed methylene chloride layer was dried with molecular sieves and stripped of low boiling constituents in a flash evaporating apparatus to obtain a semi-crystalline residue. This residue was suspended in 20 milliliters of hexane at room temperature and the hexane suspension filtered to remove the undissolved crystalline solid. The filtrate was saved. The crystalline product isolated by filtration was recrystallized from hexane and the recrystallized product found to melt at 86 to 86.5° C. IR, NMR and elemental analyses confirmed the identity of this product as being bis(2-chloro-2-methylpropyl)cyclopropenone.

The saved filtrate was stripped under reduced pressure to remove the low boiling constituents and obtain an oily residue which was dissolved in 25 milliliters of acetone plus 1 milliliter of water and the resulting solution heated at the boiling temperature for 2 minutes. Following the heating period, the solution was poured into 100 milliliters of water and the aqueous mixture twice extracted with 15-milliliter portions of methylene chloride. The methylene chloride portions were combined, dried over molecular sieves and stripped under reduced pressure to obtain a semi-solid residue. This residue was then suspended in hexane and filtered to remove a crystalline solid product which was recrystallized from carbon tetrachloride. The recrystallized bis(2-methylpropenyl)cyclopropenone product was found to melt at 144° to 145° C. The identity of this product was confirmed by elemental analysis and IR and NMR spectral analysis.

Example 4

Aluminum chloride (4.0 grams) and tetrachlorocyclopropene (5.4 grams) were dispersed in 25 milliliters of methylene chloride. 1 - methylcyclohexene (5.8 grams) was added slowly portionwise by means of a syringe to the methylene chloride mixture. The addition of 1-methylcyclohexene caused the reaction temperature to rise to reflux. Upon completing the addition of the 1-methylcyclohexene, the reaction mixture was poured into 200 milliliters of ice water. During the addition of the reaction mixture to the ice water, a two-phase system comprised of an organic phase and an aqueous phase was formed. The organic phase was separated by decantation, dried over molecular sieves, and stripped under vacuum to provide a viscous brown oil. This oil on trituration with 25 milliliters of ligroine containing 10 percent methanol provided crystalline bis (2-chloro-2-methylcyclohexyl)cyclopropenone. Recrystallization from hexane gave a product melting point of 135 to 136° C.

Example 5 p-Fluorophenyltrichlorocyclopropene (5 grams) was added slowly portion-wise to aluminum chloride (2.66 grams) dispersed in methylene chloride (100 ml.). To this mixture was added 1,1-dichloroethylene (5 grams) and the resulting reaction mixture was heated to the boiling temperature and under reflux for about 1 hour. Following the heating period, the reaction mixture was allowed to cool briefly and was then poured into about 300 milliliters of ice water whereupon a two-phase system, i.e., organic layer and aqueous layer, was formed. The organic layer was removed by decantation, washed with water and the washed organic layer dried over sodium sulfate. The dried methylene chloride solution was stripped under reduced pressure to remove the low boiling constituents and obtain an oily product residue. This oily product residue was thereafter cooled to induce crystallization thereof. The crystalline product thus formed was removed by filtration, washed and the washed 1-(2,2-dichlorovinyl)-2-(p-fluorophenyl)cyclopropenone product found to melt at 138° to 140° C.

Example 6

A 250 milliliter, round-bottomed, 3-necked flask fit with a stirrer, reflux condenser and a thermometer reaching into the reaction zone was charged with 100 milliliters of dried methylene chloride and aluminum bromide (6.5 grams, 0.024 mole) was dispersed therein with stirring. Following the addition of the aluminum bromide, stirring was continued and p-fluorophenyltrichlorocyclopropene (5.0 grams, 0.021 mole) was added, whereupon the temperature of the reaction mixture rose from 24 to 30° C. The substantially homogeneous reaction mixture was recooled to 20° C. with an external ice bath and freshly distilled 1,1-dibromoethylene (18.0 grams, 0.1 mole) was pipetted in. The mixture was then heated to reflux (40° C.) for 30 minutes. Following the heating period, the reaction mixture was cooled to about 20° C. and poured with vigorous stirring into approximately 200 milliliters of ice water. A two-phase liquid system formed. The lower organic layer containing the desired product was separated by decantation and washed once with 100 milliliters of distilled water and the washed organic layer dried over 5 grams of anhydrous sodium sulfate.

The dried organic layer was stripped under vacuum without heating to remove the low boiling constituents, leaving an oily residue. This oily residue was allowed to remain at 0° C. overnight whereupon a crystalline solid product separated from the oil. The oil and crystalline product were taken up in 25 milliliters of hot acetone, recooled to produce crystalline 1-(4-fluorophenyl)-2-(2,2-dibromovinyl)cyclopropenone, which on recrystallization from acetone exhibited a melting point of 160° to 161° C.

In similar operations carried out in accordance with the teachings of the present specification, the following disubstituted cyclopropenone compounds are prepared.

1-(4-chlorophenyl) - 2 - (2,2-dichlorovinyl)cyclopropenone (molecular weight 259.4) by reacting together 4-phenyldichlorocyclopropenium tetrachloroaluminate and 1,1-dichloroethylene in CHCl₃ at reflux (61° C.).

1-(2,4,6 - trimethylphenyl) - 2 - (2,2-dibromovinyl)cyclopropenone (molecular weight 355.9) by reacting together 2,4,6 - trimethylphenyldibromocyclopropenium tetrabromoaluminate and 1,1 - dibromoethylene in 1,1,2-trichloroethane at 80° C.

Bis(2 - methylpropene)cyclopropenone (melting point 144 to 145° C.) by dispersing tribromocycyopropenium tetrabromogallate in 1,2-dichloroethane and bubbling 2-methylpropene therethrough for 45 minutes at 0° C.

1 - (4 - bromophenyl)-2-(2-methyl-2-chlorocyclohexyl) cyclopropenone (molecular weight 299.4) by reacting together 4-bromophenylcyclopropenium hexabromoantimonate and 1-methylcyclohexene in methylene chloride at −10° C. for 2 hours.

The new disubstituted cyclopropenone compounds of the present invention are useful for the control and kill of various bacterial and fungal organisms in a variety of environments such as soil, soaps, inks, plastics, textiles, woods, paints and the like. For such use, the unmodified compound can be employed. Alternatively, the compound can be dispersed on an inert solid and the resulting product can be employed as a dust. Also, such preparations can be dispersed in water with or without the aid of a wetting agent, and the resulting aqueous dispersions employed as sprays, drenches or washes. In other procedures, the compound can be employed in oil or other solvents or as a constituent in solvent-in-water or water-in-solvent emulsions or as aqueous dispersions thereof which can be applied as a spray, drench or wash. In representative operations, the desired compound was added to a suitable nutrient agar composition. The nutrient agar composition was then poured into a petri plate and allowed to solidify. Following the solidification of the agar, the surface was inoculated and the inoculated plates incubated under optimal growth conditions for the organism being tested. As a result of such operations, bis(2,2-dichlorovinyl)cyclopropenone, bis(2,2-dibromovinyl)cyclopropenone and bis-(2-methylpropenyl)cyclopropenone each gave complete kills of *Staphylococcus aureus, Myco. phlei, Tricophyton mentagrophytes, Bacillus subtilis, Pulluraria pullulans* and *Aspergillus terreus* when employed as the sole toxic constituent and at a rate of 500 parts per million by weight of the agar composition.

In further operations, bis(2-chloro-2-methylcyclohexyl)cyclopropenone, when employed in nutrient agar as the sole toxic constituent in an amount sufficient to supply 10 parts per million by weight with respect to the total weight of the agar composition, gives complete kills of *Myco. phlei* and *Tricophyton mentagrophytes*.

In other operations, 1-(4-fluorophenyl)-2-(2,2-dichlorovinyl)cyclopropenone, bis(2 - chloro - 2 - methylcyclohexyl)cyclopropenone, bis(2,2 - dibromovinyl)cyclopropenone and bis(2,2-dichlorovinyl)cyclopropenone each gave substantially complete kills of mosquito larva when employed in the larva's aqueous environment at 25 parts per million by weight.

The starting materials of the present invention are all prepared in accordance with known procedures.

I claim:
1. A disubstituted cyclopropenone corresponding to the formula

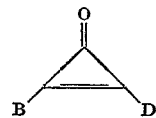

wherein B represents 4-fluorophenyl, 4-chlorophenyl, 4-bromophenyl, 4-tolyl or 2,4,6-trimethylphenyl and D represents 2,2-dihalovinyl, 2-methylpropenyl, 2-methyl-2-halocyclohexyl or 2-halo-2-methylpropyl.

2. The compound claimed in claim 1 wherein the disubstituted cyclopropenone is 1-(4-fluorophenyl)-2-(2,2-dichlorovinyl)cyclopropenone.

References Cited

Krebs: "Angew. Chem., Int. Ed.," vol. 4, No. 1, pp. 10–22 (1965).

LEON ZITVER, Primary Examiner

N. MORGENSTERN, Assistant Examiner